(12) United States Patent
Zhi

(10) Patent No.: US 12,467,580 B1
(45) Date of Patent: Nov. 11, 2025

(54) FOLDABLE SUPPORT BRACKET

(71) Applicant: Tao Zhi, Guangdong (CN)

(72) Inventor: Tao Zhi, Guangdong (CN)

(*) Notice: Subject to any disclaimer, the term of this patent is extended or adjusted under 35 U.S.C. 154(b) by 0 days.

(21) Appl. No.: 19/180,936

(22) Filed: Apr. 16, 2025

Related U.S. Application Data

(63) Continuation of application No. PCT/CN2025/087020, filed on Apr. 2, 2025.

(51) Int. Cl.
*F16M 11/10* (2006.01)
*A61L 9/04* (2006.01)
*F16M 11/04* (2006.01)

(52) U.S. Cl.
CPC ............. *F16M 11/10* (2013.01); *A61L 9/042* (2013.01); *F16M 11/041* (2013.01); *A61L 2209/15* (2013.01)

(58) Field of Classification Search
CPC .... F16M 11/10; F16M 11/041; A61L 2209/15
See application file for complete search history.

(56) References Cited

U.S. PATENT DOCUMENTS

| | | | |
|---|---|---|---|
| 9,610,376 B2* | 4/2017 | Esses | A61L 9/03 |
| 10,081,309 B2* | 9/2018 | Gao | B60R 11/02 |
| 11,991,430 B2* | 5/2024 | Nazuka | F16M 11/06 |
| 12,089,727 B2* | 9/2024 | Liu | A45F 5/10 |
| 2015/0257288 A1* | 9/2015 | Livernois | H04B 1/3877 248/346.06 |
| 2018/0043840 A1* | 2/2018 | Minn | B60R 11/0241 |
| 2020/0235770 A1* | 7/2020 | Yim | H04B 1/3877 |
| 2023/0291822 A1* | 9/2023 | Liu | G06F 1/1632 |
| 2023/0312197 A1* | 10/2023 | Jüngst | A61L 9/12 220/212 |
| 2025/0160511 A1* | 5/2025 | Cai | A47B 23/044 |

* cited by examiner

*Primary Examiner* — Bradley Duckworth
(74) *Attorney, Agent, or Firm* — HOWARD M COHN and Associates, LLC

(57) ABSTRACT

A foldable support bracket includes a base, a linkage mechanism, a retention assembly and a fragrance storage unit. The base is configured to connect with an external carrier. The linkage mechanism is pivotally coupled to the base and is configured to switch between a folded non-deployed state overlapped with the base, and a deployed state forming an angle with the base. The linkage mechanism is provided with an avoidance space, and when the linkage mechanism is in the folded non-deployed state relative to the base, a portion of the base is positioned within the avoidance space. The retention assembly is configured to position a product to be secured. The retention assembly is pivotally coupled to the linkage mechanism and is configured to switch between a folded non-deployed state overlapped with the linkage mechanism, and a deployed state forming an angle with the linkage mechanism.

20 Claims, 13 Drawing Sheets

US 12,467,580 B1

FOLDABLE SUPPORT BRACKET

CROSS-REFERENCE TO RELATED APPLICATIONS

This application is a continuation of International Application No. PCT/CN2025/087020, filed on Apr. 2, 2025, the entire content of which is incorporated herein by reference.

TECHNICAL FIELD

The present invention relates to the technical field of vehicle-mounted phone holders, in portionicular to a foldable support bracket.

BACKGROUND

With the advancement of communication technologies, mobile phones have become indispensable tools in users' daily lives and work. For safety and convenience when driving (such as using phone navigation functions), vehicle-mounted phone holders have become highly popular accessories. However, due to structural limitations in existing designs, these conventional holders can only secure phones, resulting in single functionality that fails to meet growing user demands, while their bulky size occupies excessive space.

SUMMARY

The embodiments of the present invention provide a foldable support bracket designed to address the limitations of vehicle-mounted phone holders in related art, specifically their single functionality and excessive space occupation due to structural design constraints.

The present invention provides a foldable support bracket, which includes a base, a linkage mechanism, a retention assembly and a fragrance storage unit. The base is configured to connect with an external carrier. The linkage mechanism is pivotally coupled to the base and is configured to switch between a folded non-deployed state overlapped with the base, and a deployed state forming an angle with the base. The linkage mechanism is provided with an avoidance space, and when the linkage mechanism is in the folded non-deployed state relative to the base, a portion of the base is positioned within the avoidance space. The retention assembly is configured to position a product to be secured. The retention assembly is pivotally coupled to the linkage mechanism and is configured to switch between a folded non-deployed state overlapped with the linkage mechanism, and a deployed state forming an angle with the linkage mechanism. The fragrance storage unit is configured to store a fragrance product, and the fragrance storage unit is disposed on at least one of the base, the linkage mechanism, or the retention assembly.

Based on the foldable support bracket in the embodiments of the present invention, by designing the fragrance storage unit for storing the fragrance product, the foldable support bracket is enabled to not only secure the product to be secured but also create a comfortable ambiance, thus providing multifunctional features to meet user needs. By designing the pivotal connection between the linkage mechanism and the base as well as the retention assembly, the retention assembly can be rotated relative to the linkage mechanism to a folded non-deployed state, and the linkage mechanism can be rotated relative to the base to a folded non-deployed state. In this way, the spatial footprint of the foldable support bracket in its idle state is reduced. By designing an avoidance space on the linkage mechanism, when the linkage mechanism is rotated relative to the base to a folded non-deployed state, a portion of the base is disposed within the avoidance space. This configuration allows the base to reasonably utilize the avoidance space, thereby further effectively reducing the spatial footprint of the foldable support bracket in its idle state.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
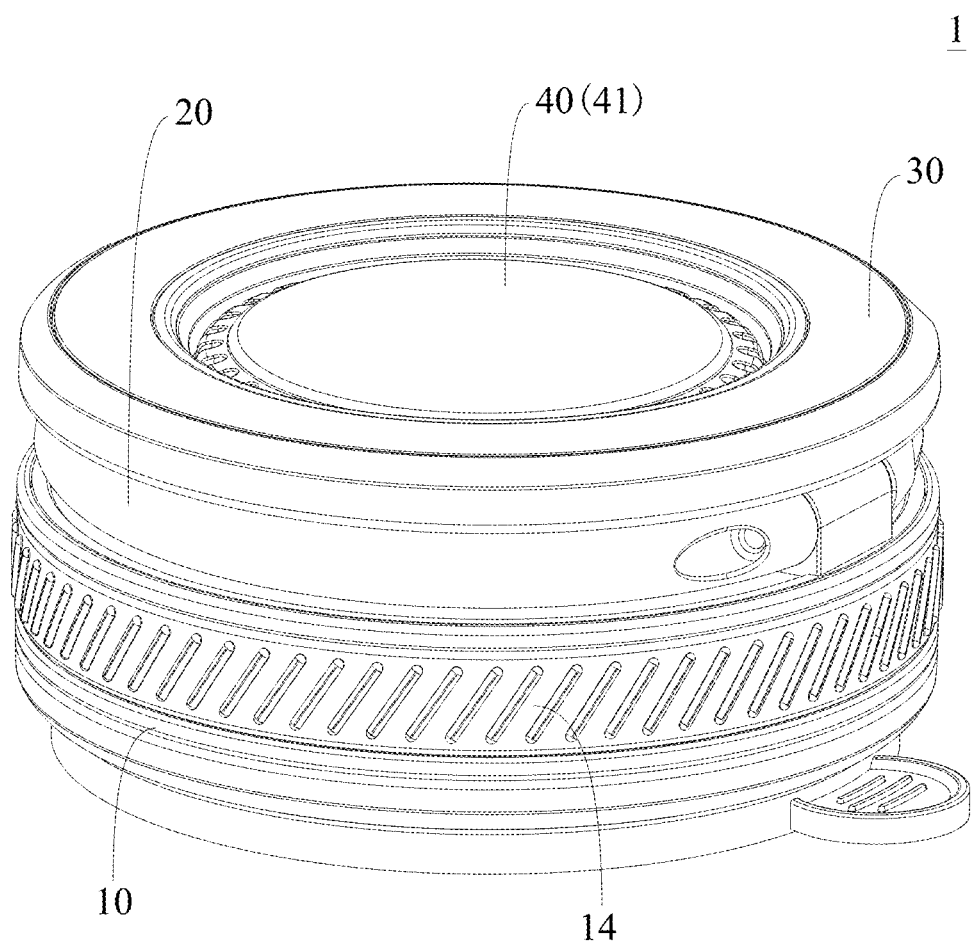
FIG. 1 is a schematic structural view of the foldable support bracket in a folded non-deployed state according to an embodiment of the present invention.
Figure 2:
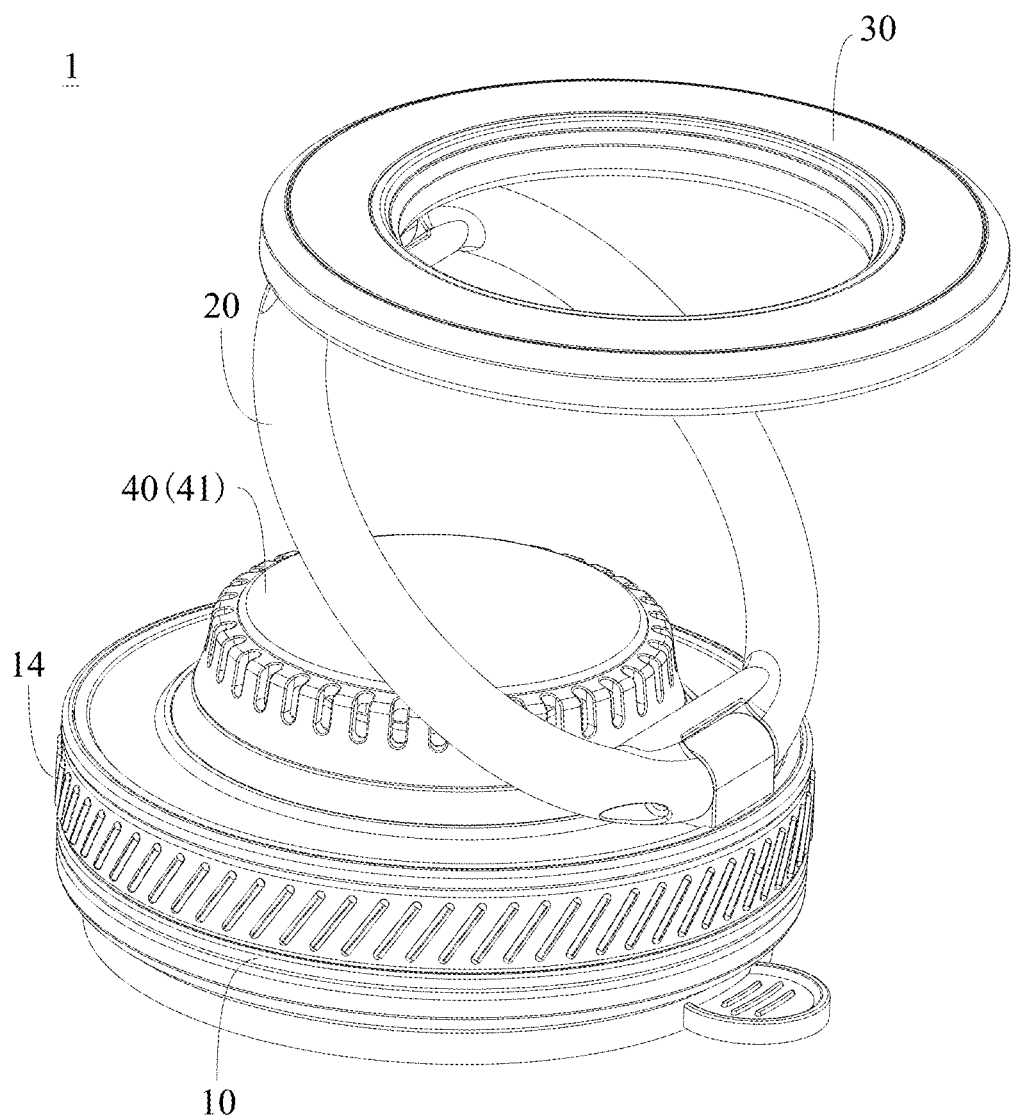
FIG. 2 is a schematic structural view of the foldable support bracket in a deployed state according to an embodiment of the present invention.
Figure 3:
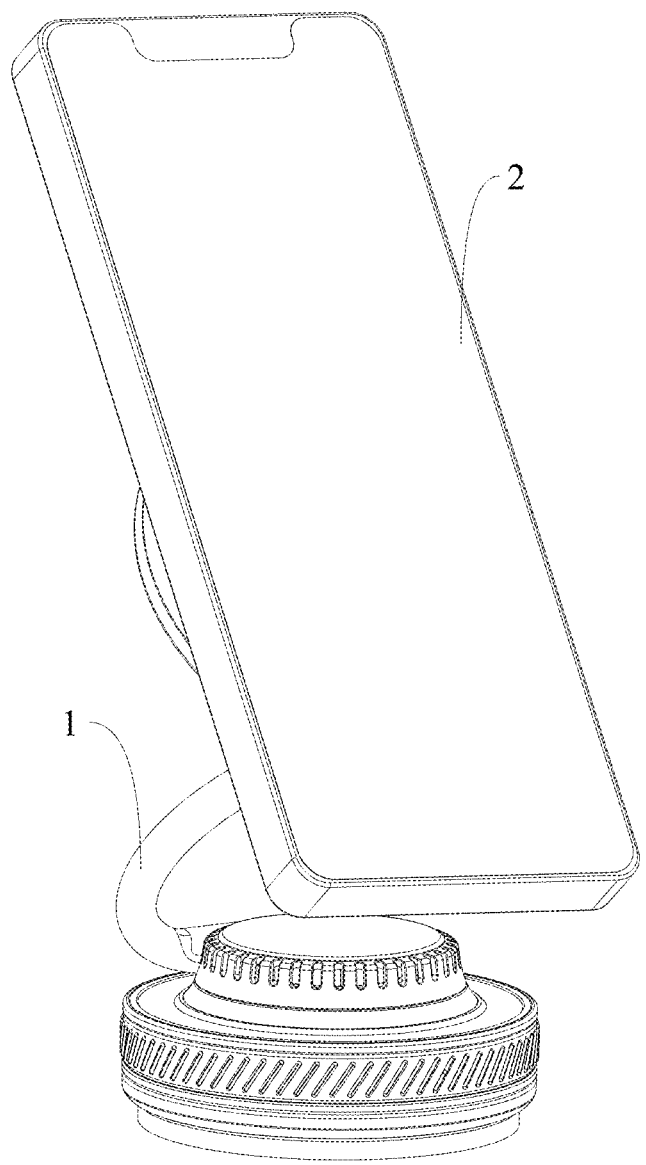
FIG. 3 is a schematic structural view showing a product to be secured (mobile phone) positioned on the foldable support bracket via a retention assembly according to an embodiment of the present invention.
Figure 4:
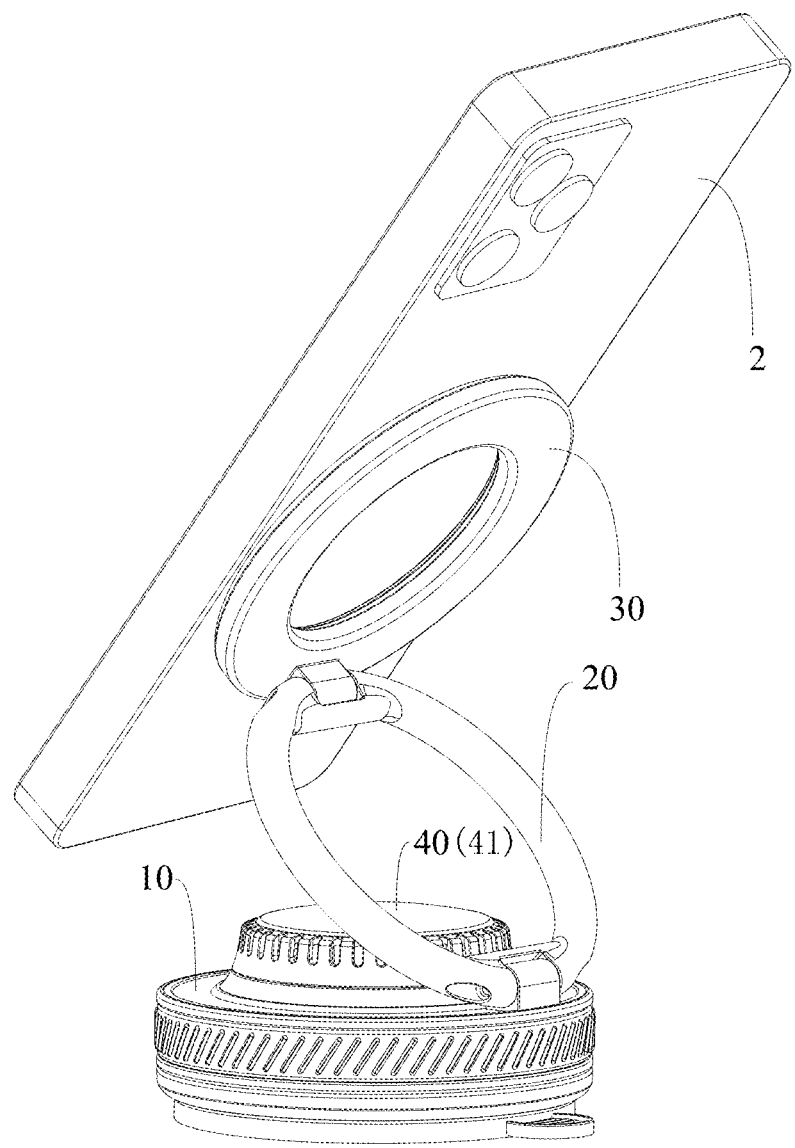
FIG. 4 is a schematic structural view of FIG. 3 from another perspective.

In order to make the aims, technical solution and advantages of the present invention will be clearly, the present invention is further described below in combination with accompanying drawings and implementations. It should be understood that the specific embodiments described herein are intended only to explain the present invention and are not intended to define the present invention.

Referring to FIGS. 1 to 4, the present application provides a foldable support bracket 1. The components of the foldable support bracket 1 are arranged compactly to effectively reduce the spatial footprint when the foldable support bracket 1 is in an idle state.

The foldable support bracket 1 includes a base 10, a linkage mechanism 20, a retention assembly 30 and a fragrance storage unit 40. The base 10 is configured to connect with an external carrier. The linkage mechanism 20 is pivotally coupled to the base 10 and is configured to switch between a folded non-deployed state overlapped with the base 10, and a deployed state forming an angle with the base 10. The linkage mechanism 20 is provided with an avoidance space, and when the linkage mechanism 20 is in the folded non-deployed state relative to the base 10, a portion of the base 10 is positioned within the avoidance space. The retention assembly 30 is configured to position a product 2 to be secured. The retention assembly 30 is pivotally coupled to the linkage mechanism 20 and is configured to switch between a folded non-deployed state overlapped with the linkage mechanism 20, and a deployed state forming an angle with the linkage mechanism 20. The fragrance storage unit 40 is configured to store a fragrance product 17, and the fragrance storage unit 40 is disposed on at least one of the base 10, the linkage mechanism 20, or the retention assembly 30.

Reference to FIGS. 1 to 15, specific structural embodiments of the foldable support bracket 1 are described in detail as follows:

As shown in FIGS. 1 to 4, the foldable support bracket 1 includes a base 10, a linkage mechanism 20, a retention assembly 30 and a fragrance storage unit 40.

The base 10 serves as the structural foundation of the foldable support bracket 1. The specific material of the base 10 is not limited herein, and designers can reasonably select it based on practical requirements. For example, the material of the base 10 may include, but is not limited to, plastic or other polymeric materials. The detailed configuration of the base 10 is described below.

The base 10 is configured to connect to an external carrier. The external carrier may include, but is not limited to, a vehicle's front dashboard, windshield, desktop, or wall surface, etc. The connection method between the base 10 and the external carrier is described below.

The linkage mechanism 20 serves as the connecting mechanism of the foldable support bracket 1 and is configured to connect the base 10 and the retention assembly 30. The specific material of the linkage mechanism 20 is not limited herein, and designers can reasonably select it based on practical requirements. For example, the material of the linkage mechanism 20 may be metal.

The linkage mechanism 20 is pivotally coupled to the base 10. The specific rotational connection method between the linkage mechanism 20 and the base 10 is not limited herein. Designers can make reasonable designs based on practical requirements. For example, the linkage mechanism 20 may include, but is not limited to, being pivotally coupled to the base 10 via a rotating shaft.

The linkage mechanism 20 is configured to switch relative to the base 10 between a folded non-deployed state and an angled deployed state. The linkage mechanism 20 has both a non-deployed state and a deployed state. When the foldable support bracket 1 is not required to support the product 2 to be secured, the linkage mechanism 20 can rotate relative to the base 10 to fold flush with the base 10 in the non-deployed state, thereby reducing the spatial footprint of the foldable support bracket 1. When the foldable support bracket 1 is required to support the product 2 to be secured, the linkage mechanism 20 can rotate relative to the base 10 to form an angle with the base 10 in the deployed state, thereby providing effective support for the product 2 to be secured. It should be noted that switching between the non-deployed state and deployed state of the linkage mechanism 20 may be accomplished either by manual control (such as by a user directly applying external force) to the linkage mechanism 20 or by electric control (such as through coordinated driving of the linkage mechanism 20 by a motor, gears, etc.).

The linkage mechanism 20 is provided with an avoidance space. When the linkage mechanism 20 includes a connecting plate, the avoidance space may be an avoidance groove formed in the connecting plate. When the linkage mechanism 20 is a connecting ring according to the following description, an annular hole of the connecting ring may form the avoidance space.

When the linkage mechanism 20 is in the folded non-deployed state relative to the base, a portion of the base 10 is positioned within the avoidance space. This configuration allows the base 10 to utilize the avoidance space efficiently, thereby reducing the spatial footprint of the foldable support bracket 1 in its idle state.

As shown in FIGS. 1 to 4, the retention assembly 30 serves as the positioning structure of the foldable support bracket 1. It may position the product 2 to be secured by methods including, but not limited to, clamping fixation, negative pressure adsorption, or magnetic attraction. The product 2 to be secured may include but is not limited to magnetic-equipped devices such as mobile phones, smartwatches, or smart bracelets. The detailed structure of the retention assembly 30 is described below.

The retention assembly 30 is pivotally coupled to the linkage mechanism 20. The specific rotational connection method between the retention assembly 30 and the linkage mechanism 20 is not limited herein. Designers can make reasonable designs based on practical requirements. For example, the retention assembly 30 may include, but is not limited to, being pivotally coupled to the linkage mechanism 20 via a rotating shaft.

The retention assembly 30 is configured to switch relative to the linkage mechanism 20 between a folded non-deployed state and an angled deployed state. The retention assembly 30 has both a non-deployed state and a deployed state. When the foldable support bracket 1 is not required to support the product 2 to be secured, the retention assembly 30 can rotate relative to the linkage mechanism 20 to fold flush with the linkage mechanism 20 in the non-deployed state, thereby reducing the spatial footprint of the foldable support bracket 1. When the foldable support bracket 1 is required to support the product 2 to be secured, the retention assembly 30 can rotate relative to the linkage mechanism 20 to form an angle with the linkage mechanism 20 in the deployed state, thereby providing effective support for the product 2 to be secured. It should be noted that switching between the non-deployed state and deployed state of the retention assembly 30 may be accomplished either by manual control (such as by a user directly applying external force) to the retention assembly 30 or by electric control (such as through coordinated driving of the retention assembly 30 by a motor, gears, etc.).

The fragrance storage unit 40 serves as the storage structure of the foldable support bracket 1, configured to store the fragrance product 17. It is understood that the fragrance storage unit 40 may constitute either a virtual structure such as a designated storage space for storing the fragrance product 17, or a physical structure such as a storage case for storing the fragrance product 17. The specific implementation of the fragrance storage unit 40 is described below.

The fragrance storage unit 40 is disposed on at least one of the base 10, the linkage mechanism 20, or the retention assembly 30. For example, the fragrance storage unit 40 may be disposed only on the base 10, or only on the linkage mechanism 20, or only on the retention assembly 30. Also, for example, the fragrance storage unit 40 may be disposed on both the base 10 and the linkage mechanism 20, or on both the base 10 and the retention assembly 30, or on both the linkage mechanism 20 and the retention assembly 30. Furthermore, for example, the connection part of the fragrance product 17 may also be disposed on the base 10, the linkage mechanism 20, and the retention assembly 30.

Based on the foldable support bracket 1 in the embodiments of the present invention, by designing the fragrance storage unit 40 for storing the fragrance product 17, the foldable support bracket 1 is enabled to not only secure the product 2 to be secured but also create a comfortable ambiance, thus providing multifunctional features to meet user needs. By designing the pivotal connection between the linkage mechanism 20 and the base 10 as well as the retention assembly 30, the retention assembly 30 can be rotated relative to the linkage mechanism 20 to a folded non-deployed state, and the linkage mechanism 20 can be rotated relative to the base 10 to a folded non-deployed state. In this way, the spatial footprint of the foldable support bracket 1 in its idle state is reduced. By designing an avoidance space on the linkage mechanism 20, when the linkage mechanism 20 is rotated relative to the base 10 to a folded non-deployed state, a portion of the base 10 is disposed within the avoidance space. This configuration allows the base 10 to reasonably utilize the avoidance space, thereby further effectively reducing the spatial footprint of the foldable support bracket 1 in its idle state.

As shown in FIG. 1 and FIGS. 5 to 7, the base 10 has a bottom surface 111a for facing an external carrier, and a top surface 113a disposed opposite to the bottom surface 111a. The fragrance storage unit 40 is disposed on one side of the top surface 113a of the base 10. The linkage mechanism 20 includes a connecting ring pivotally coupled to the top surface 113a. The annular hole of the connecting ring is used to form the avoidance space. When the connecting ring is in a folded non-deployed state relative to the base 10, at least a portion of the fragrance storage unit 40 is disposed within the annular hole of the connecting ring. This configuration allows the fragrance storage unit 40 to reasonably utilize the area of the annular hole of the connecting ring, thereby further effectively reducing the spatial footprint of the foldable support bracket 1 in its idle state.

It should be understood that the foldable support bracket 1 may include a cover 412 covering one side of the storage cavity of the fragrance storage unit 40. The cover 412 is movably or detachably connected to at least one of the base 10, the linkage mechanism 20, and the retention assembly 30 to facilitate the replacement of the fragrance product 17.

Figure 7:
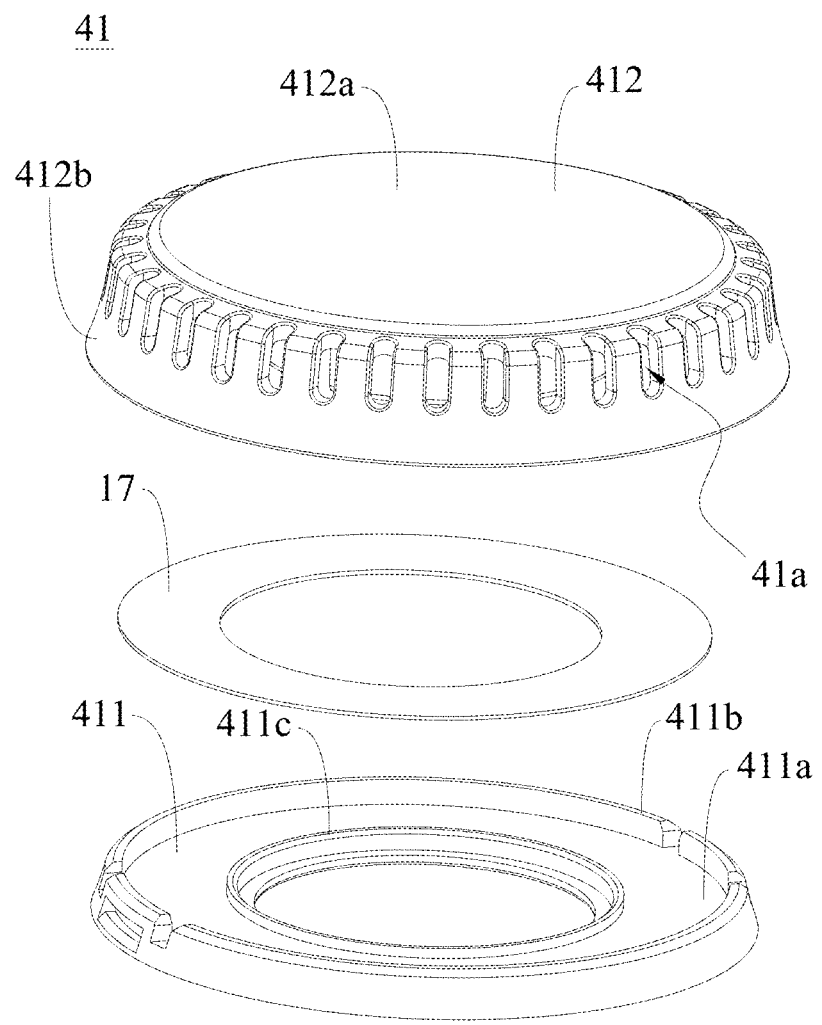
FIG. 7 is an exploded schematic view of a fragrance storage cartridge according to an embodiment of the present invention.

As shown in FIG. 7, when the fragrance storage unit 40 is a physical structure such as a storage case for storing the fragrance product 17, the fragrance storage unit 40 includes a fragrance storage case 41. The fragrance storage case 41 includes a bottom shell 411 and a cover 412. The bottom shell 411 is disposed on the top surface 113a; the cover 412 is either movably or detachably connected to the bottom shell 411 to together form a storage cavity for storing the fragrance product 17, and the cover is provided with at least one fragrance vent 41a. Herein, the specific installation method between the bottom shell 411 and the base 10 is not limited. Designers can make reasonable designs based on practical requirements. For example, the bottom shell 411 may be detachably connected to the base 10 by at least one of methods including, but not limited to, screwing, clamping, or plugging. Also, for example, the bottom shell 411 may be permanently connected to the base 10 by methods including, but not limited to, gluing, injection molding, or 3D printing. Herein, the specific movable or detachable connection method between the cover 412 and the bottom shell 411 is not limited. Designers can make reasonable designs based on practical requirements. For example, the cover 412 may rotate or slide relative to the bottom shell 411. For example, the cover 412 may be detachably connected to the bottom shell 411 by at least one of methods including, but not limited to, screwing, clamping, or plugging. By designing the fragrance storage unit 40 as the fragrance storage case 41, and the fragrance storage case 41 as the bottom shell 411 and the cover 412, the bottom shell 411 and the cover 412 together enclose to form a storage cavity. The fragrance product 17 is stored in the storage cavity, which can provide a comfortable ambiance for users.

As shown in FIG. 7, the at least one fragrance vent 41a includes a plurality of fragrance vents 41a, the cover 412 includes a base plate 412a and a sidewall structure 412b connected to the edge of the base plate 412a; the plurality of fragrance vents 41a are circumferentially arranged at a junction between the base plate 412a and the sidewall structure 412b. By designing the plurality of fragrance vents 41a to be circumferentially arranged at the junction between the base plate 412a and the sidewall structure 412b, the fragrance emitted by the fragrance product 17 can diffuse all around through the fragrance vents 41a, thereby providing a comfortable ambiance for users.

Specifically, the bottom shell 411 includes a bottom plate 411a, an outer edge 411b, and an inner edge 411c. The bottom plate 411a is annular. The outer edge 411b is connected to the outer side edge of the bottom plate 411a, and the inner edge 411c is connected to the inner side edge of the bottom plate 411a. The bottom plate 411a, the outer edge 411b, the inner edge 411c, the base plate 412a, and the sidewall structure 412b together enclose to form a storage cavity. By designing the bottom plate 411a as an annular shape, the part of the second sub-housing 113 (described below) that protrudes away from the bottom surface 111a can be stored in the annular hole of the bottom plate 411a. This makes the structural arrangement of the fragrance storage case 41 and the base 10 more compact, and can further reduce the overall spatial footprint of the foldable support bracket 1.

In other embodiments, the fragrance vents 41a may consist of a single annular vent.

As shown in FIG. 5, FIG. 6 and FIGS. 8 to 10, the base 10 includes a first housing 11, a drive bracket 12, a moving member 13 and a suction cup structure 14. The first housing has the bottom surface 111a and the top surface 113a. The drive bracket 12 is disposed on the first housing 11 and is rotatable relative to the first housing 11, and has an inclined surface 124c. The moving member 13 is disposed on the drive bracket 12 corresponding to the inclined surface 124c. The suction cup structure 14 is connected to the moving member 13. The drive bracket 12 is configured to rotate in a forward direction relative to the first housing 11 under an applied force, thereby pushing the moving member 13 to move from a highest side to a lowest side of the inclined surface 124c, such that the moving member 13 drives the suction cup structure 14 toward the external carrier to reach a suction state engaged with the external carrier. The drive bracket 12 is further configured to rotate in a backward direction relative to the first housing 11 under the applied force, thereby pushing the moving member 13 to move from the lowest side to the highest side of the inclined surface 124c, such that the moving member 13 drives the suction cup structure 14 away from the external carrier to reach a released state detached from the external carrier.

The first housing 11 serves as the base housing of the base 10. The specific material of the first housing 11 is not limited herein, and designers can reasonably select it based on practical requirements. For example, the material of the first housing 11 may include, but is not limited to, plastic or other polymeric materials. The specific structure of the first housing 11 is described below.

The drive bracket 12 serves as the driving component of the base 10. By rotating relative to the first housing 11, it causes the inclined surface 124c to push against the moving member 13, thereby driving the moving member 13 to move the suction cup structure 14. The specific material of the drive bracket 12 is not limited herein, and designers can reasonably select it based on practical requirements. For example, the material of the drive bracket 12 may include, but is not limited to, plastic or other polymeric materials. The specific structure of the drive bracket 12 is described below.

The moving member 13 serves as the power transmission component of the base 10 and is configured to convert the rotational movement of the drive bracket 12 relative to the first housing 11 into driving force. The moving member 13 may be either a rod-shaped configuration or a block-shaped configuration.

The suction cup structure 14 serves as the retention component of the base 10 and is configured to connect to the external carrier through air pressure attraction. The suction cup structure 14 is connected to the moving member 13. Under the action of the moving member 13, the suction cup structure 14 moves toward the external carrier to reach the suction state engaged with the external carrier. Also, under the action of the moving member 13, the suction cup structure 14 moves away from the external carrier to reach the released state detached from the external carrier. The specific structure of the suction cup structure 14 is described below.

By designing the first housing 11, the drive bracket 12, the moving member 13 and the suction cup structure 14, these components cooperate with each other. When an external force is applied, the drive bracket 12 rotates in a forward direction relative to the first housing 11. As the drive bracket 12 rotates, the inclined surface 124c pushes against the moving member 13. Under the pushing action of the inclined surface 124c, the moving member 13 moves from the highest side to the lowest side of the inclined surface 124c. Then, under the action of the moving member 13, the suction cup structure 14 moves toward the external carrier to reach the suction state engaged with the external carrier. In this situation, the position between the foldable support bracket 1 and the external carrier is relatively secured, thereby ensuring the effective support of the foldable support bracket 1 for the product 2 to be secured. Conversely, when an external force is applied, the drive bracket 12 rotates in a backward direction relative to the first housing 11. As the drive bracket 12 rotates, the inclined surface 124c pushes against the moving member 13. Under the pushing action of the inclined surface 124c, the moving member 13 moves from the lowest side to the highest side of the inclined surface 124c. Then, under the action of the moving member 13, the suction cup structure 14 moves away from the external carrier to reach a released state detached from the external carrier. At this time, the position between the foldable support bracket 1 and the external carrier is relatively changed, thereby enabling the storage of the foldable support bracket 1.

Specifically, as shown in FIG. 5, FIG. 6, FIG. 10 and FIG. 11, the first housing 11 includes a first sub-housing 111 having the bottom surface 111a, a second sub-housing 113 having the top surface 113a, and a connecting housing 112 disposed between the first sub-housing 111 and the second sub-housing 113. The first sub-housing 111 is fixedly connected to the connecting housing 112, the second sub-housing 113 is fixedly connected to the connecting housing 112, and the connecting housing 112 has an annular structure. The drive bracket 12 includes an inner peripheral wall 121, an outer peripheral wall 122, and a connecting wall 123; the inner peripheral wall 121 is disposed within an annular hole of the connecting housing 112, the outer peripheral wall 122 is arranged around a periphery of the connecting housing 112, the connecting wall 123 is disposed between the first sub-housing 111 and the connecting housing 112, one side of the connecting wall 123 is connected to the inner peripheral wall 121, and the other side of the connecting wall 123 is connected to the outer peripheral wall 122.

The specific fixed connection method between the connecting housing 112 and the first sub-housing 111 is not limited herein. Designers can make reasonable designs based on practical requirements. For example, the connecting housing 112 may be detachably connected to the first sub-housing 111 by at least one of methods including, but not limited to, screwing, clamping, or plugging. Similarly, the specific fixed connection method between the second sub-housing 113 and the connecting housing 112 is not limited herein. Designers can make reasonable designs based on practical requirements. For example, the second sub-housing 113 may be detachably connected to the connecting housing 112 by at least one of methods including, but not limited to, screwing, clamping, or plugging.

The inner peripheral wall 121, the outer peripheral wall 122, and the connecting wall 123 may be configured as either separate components or as an integrated structure. For example, when the inner peripheral wall 121, the outer peripheral wall 122, and the connecting wall 123 are designed as separate components, they may be detachably connected to each other by at least one of methods including, but not limited to, screwing, clamping, or plugging. As another example, when the inner peripheral wall 121, the outer peripheral wall 122, and the connecting wall 123 are designed as an integrated structure, they may be formed into an integrated structure by at least one of methods including, but not limited to, injection molding or 3D printing.

By designing the first housing 11 to include the first sub-housing 111, the second sub-housing 113, and the connecting housing 112, and designing the drive bracket 12 to include the inner peripheral wall 121, the outer peripheral wall 122, and the connecting wall 123, and also designing the connecting housing 112 to have an annular structure, the spatial arrangement of the first housing 11 and the drive bracket 12 becomes more compact. This can effectively reduce the volume of the base 10, thereby reducing the overall volume of the folding bracket 1.

As shown in FIG. 5, FIG. 6, FIG. 10 and FIG. 11, a region of the second sub-housing 113 corresponding to the annular hole of the connecting housing 112 protrudes in a direction away from the bottom surface 111a to form a movement space 113b; the drive bracket 12 further includes a driving peripheral wall 124 disposed within the movement space 113b and connected to the inner peripheral wall 121; an inner side surface of the driving peripheral wall 124 is formed with a first flange 124a and a second flange 124b protruding toward a central axis of the annular hole of the connecting housing 112, the first flange 124a extends in a direction parallel to the central axis of the annular hole of the connecting housing 112, and the second flange 124b extends in a direction circumferentially around the central axis of the annular hole of the connecting housing 112; and the second flange 124b has the inclined surface 124c; the moving member 13 is disposed within a space enclosed by the inner side surface of the driving peripheral wall 124, and one end of the moving member 13 abuts against the first flange 124a, and the other end of the moving member 13 engages with the inclined surface 124c.

The driving peripheral wall 124 and the inner peripheral wall 121 may be configured as either separate components or as an integrated structure. For example, when the driving peripheral wall 124 and the inner peripheral wall 121 are designed as separate components, they may be detachably connected to each other by at least one of methods including, but not limited to, screwing, clamping, or plugging. As another example, when the driving peripheral wall 124 and the inner peripheral wall 121 are designed as an integrated structure, they may be formed into an integrated structure by at least one of methods including, but not limited to, injection molding or 3D printing.

The inclined surface 124c is disposed on the side of the second flange 124b facing away from the bottom surface 111a, and in the direction of forward rotation, the distance between the inclined surface 124c and the bottom surface 111a gradually decreases.

When an external force is applied, the drive bracket 12 rotates in a forward direction relative to the first housing 11. Meanwhile, the first flange 124a and the inclined surface 124c of the second flange 124b push against the moving member 13 simultaneously. Under the pushing action of the inclined surface 124c, the moving member 13 moves from the highest side to the lowest side of the inclined surface 124c. Then, under the action of the moving member 13, the suction cup structure 14 moves toward the external carrier to reach the suction state engaged with the external carrier. In this situation, the position between the foldable support bracket 1 and the external carrier is relatively secured, thereby ensuring the effective support of the foldable support bracket 1 for the product 2 to be secured. Conversely, when an external force is applied, the drive bracket 12 rotates in a backward direction relative to the first housing 11. Meanwhile, the first flange 124a and the inclined surface 124c of the second flange 124b push against the moving member 13 simultaneously. Under the pushing action of the inclined surface 124c, the moving member 13 moves from the lowest side to the highest side of the inclined surface 124c. Then, under the action of the moving member 13, the suction cup structure 14 moves away from the external carrier to reach a released state detached from the external carrier. The position between the foldable support bracket 1 and the external carrier is relatively changed, thereby enabling the storage of the foldable support bracket 1.

It should be noted that when the connecting ring is in a folded non-deployed state and overlapped with the base 10, the portion of the second sub-housing 113 that protrudes away from the bottom surface 111a and the fragrance storage case 41 are both disposed within the annular hole of the connecting ring. In this way, both the base 10 and the fragrance storage case 41 can make reasonable use of the area of the annular hole of the connecting ring, further thereby effectively reducing the spatial footprint of the foldable support bracket 1 in its idle state.

Figure 10:
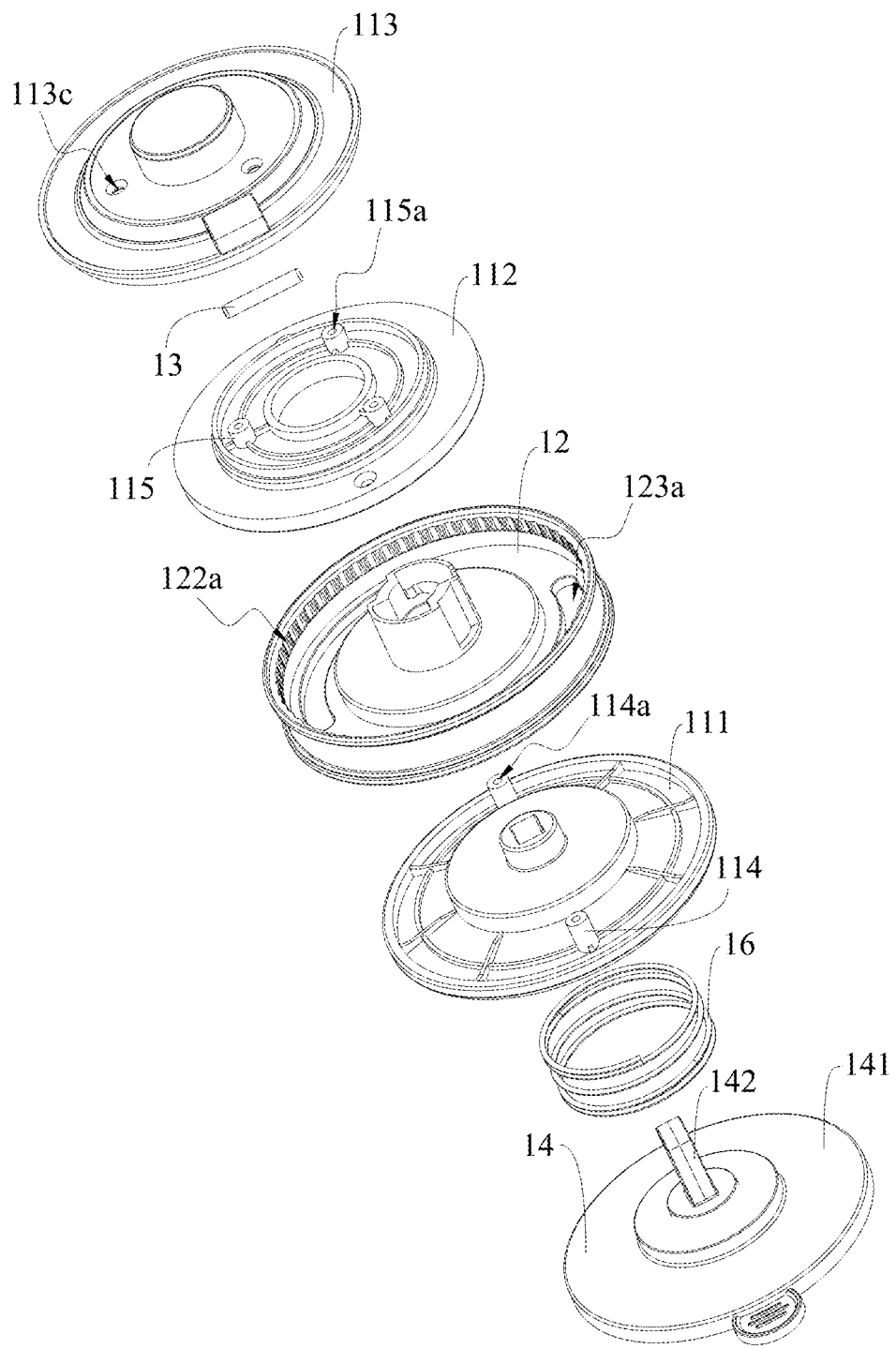
FIG. 10 is a portionially exploded schematic view of a base according to an embodiment of the present invention.
Figure 11:
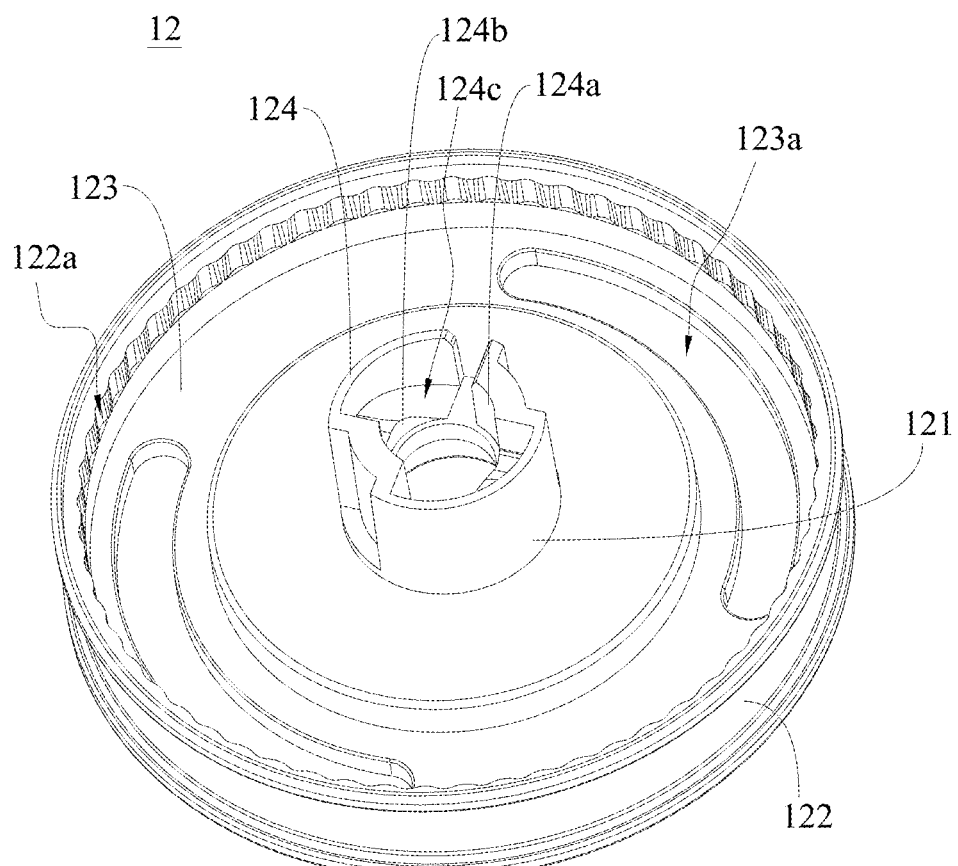
FIG. 11 is a schematic structural view of a drive bracket according to an embodiment of the present invention.
Figure 12:
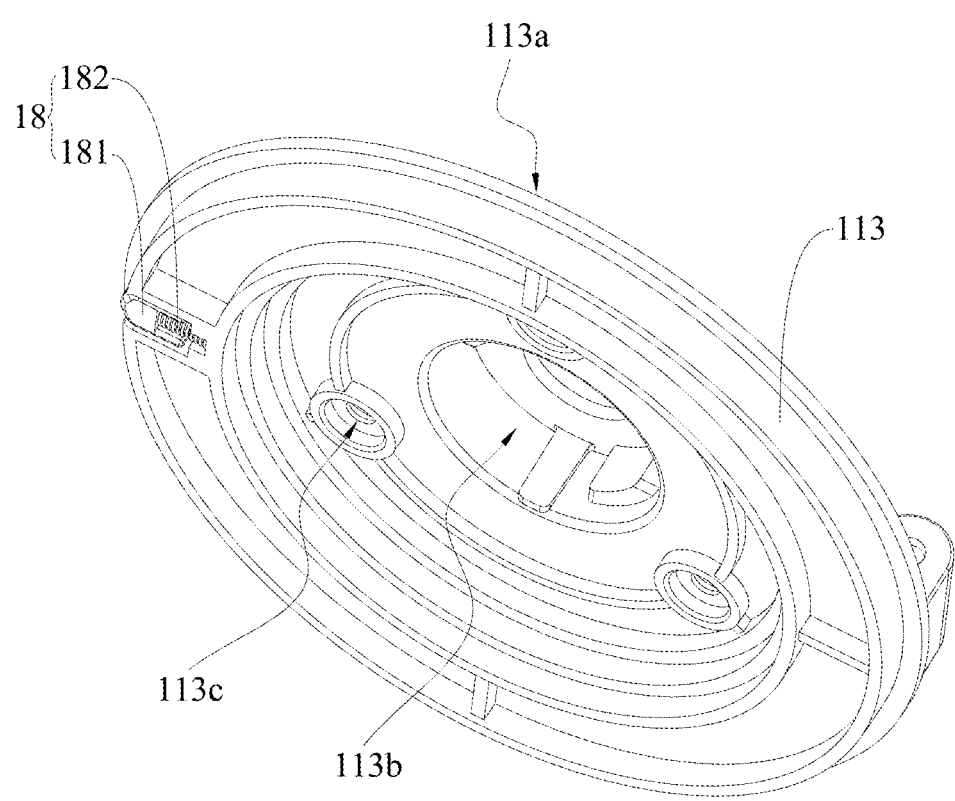
FIG. 12 is a schematic structural view of a second sub-housing according to an embodiment of the present invention.

As shown in FIGS. 10 to 12, one of an outer periphery of the connecting housing 112 and an inner side surface of the outer peripheral wall 122 is provided with a plurality of tooth grooves 122a arranged around the central axis of the annular hole of the connecting housing 112. The base 10 further includes a tooth structure 18, the tooth structure 18 is disposed on the other one of the outer periphery of the connecting housing 112 and the inner side surface of the outer peripheral wall 122, and the tooth structure 18 is engaged with a corresponding tooth groove 122a, thereby restricting rotation of the drive bracket 12 relative to the first housing 11. Further, the tooth structure 18 includes a clamping block 181 and a spring 182. One end of the spring 182 is fixedly connected to the other one of the outer periphery of the connecting housing 112 and the inner side surface of the outer peripheral wall 122, and the other end of the spring 182 is fixedly connected to the clamping block 181. The clamping block 181 is engaged with the tooth groove 122a. By designing the tooth structure 18 and the tooth grooves 122a, when the drive bracket 12 rotates relative to the first housing 11, the tooth structure 18 moves among the plurality of tooth grooves 122a, producing a "click-click-click" damping sound. After the external force acting on the drive bracket 12 is removed, the tooth structure 18 engages with one of the tooth grooves 122a, which can restrict the rotation of the drive bracket 12 relative to the first housing 11, thereby ensuring the stability of the suction cup structure 14 in the suction state.

As shown in FIG. 5, FIG. 6, FIGS. 10 to 12, the connecting wall 123 is provided with an arcuate through-hole 123a arranged about the central axis of the annular hole of the connecting housing 112; the first housing 11 further includes a first mounting post 114 passing through the arcuate through-hole 123a and fixedly connected to one of the connecting housing 112 and the first sub-housing 111, the first mounting post 114 has a first mounting hole 114a, and the other one of the connecting housing 112 and the first sub-housing 111 is provided with a first through hole 112a corresponding to the first mounting hole 114a; the base 10 further includes a first fastener 191 passing through the first through hole 112a and connected to the first mounting hole 114a, thereby positioning the connecting housing 112 relative to the first sub-housing 111. Thus, it is convenient to achieve the mounting and detachment between the connecting housing 112 and the first sub-housing 111.

The first mounting post 114 may be formed into an integrated structure with either the connecting housing 112 or the first sub-housing 111 by methods including, but not limited to, injection molding or 3D printing.

The second mounting hole 115a may be a second threaded hole, in this case the second fastener 192 is a second screw. The second screw passes through the second through hole 113c and threadably engages with the second threaded hole, thereby securely fastening the second sub-housing 113 to the connecting housing 112. Moreover, the second mounting hole 115a may also be a second snap-fit hole, in this case the second fastener 192 is a second detent pin. The second detent pin inserts through the second through hole 113c and snap-fits into the second snap-fit hole, thereby securely fastening the second sub-housing 113 to the connecting housing 112.

Figure 8:
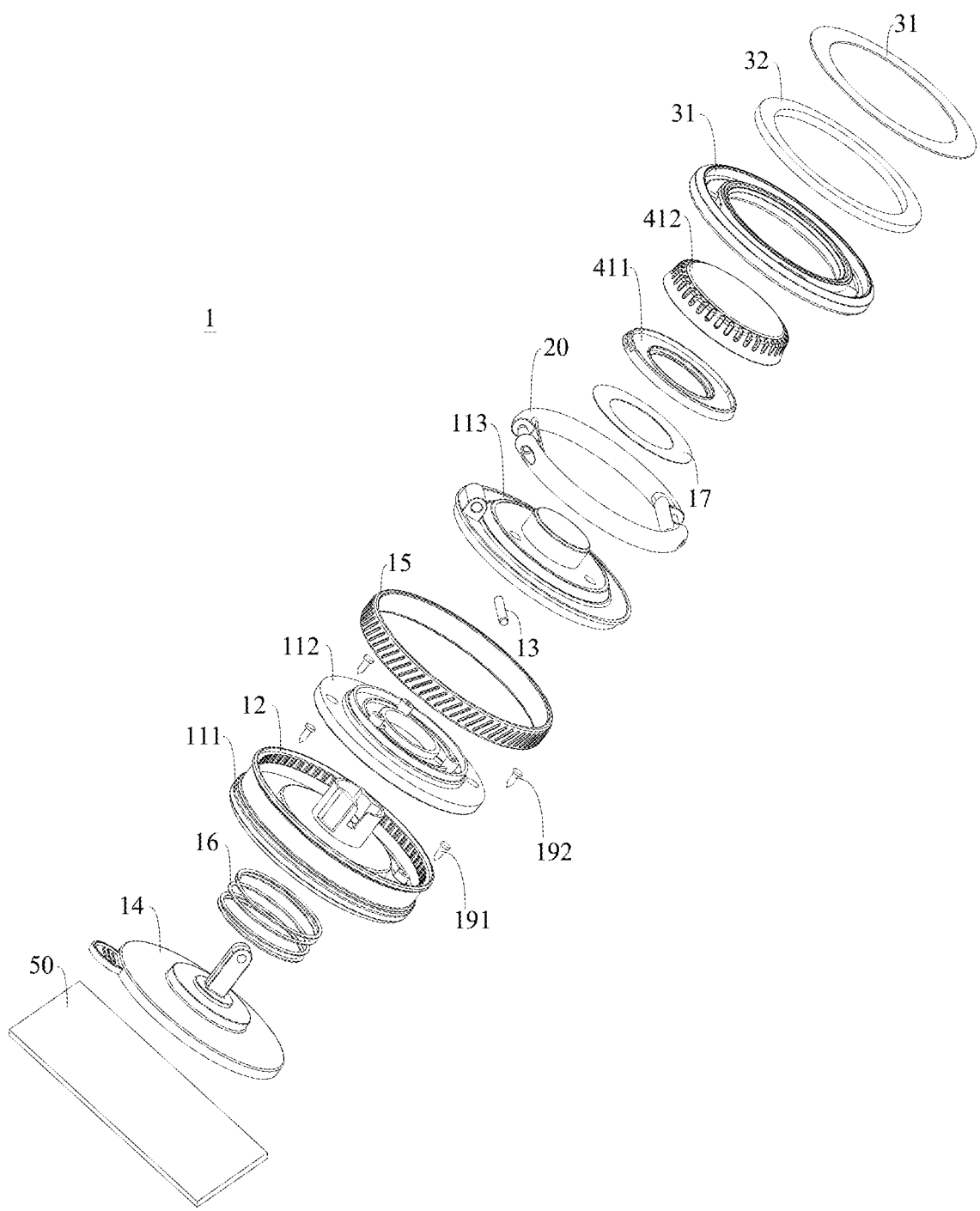
FIG. 8 is an exploded schematic view of the foldable support bracket according to an embodiment of the present invention.
Figure 9:
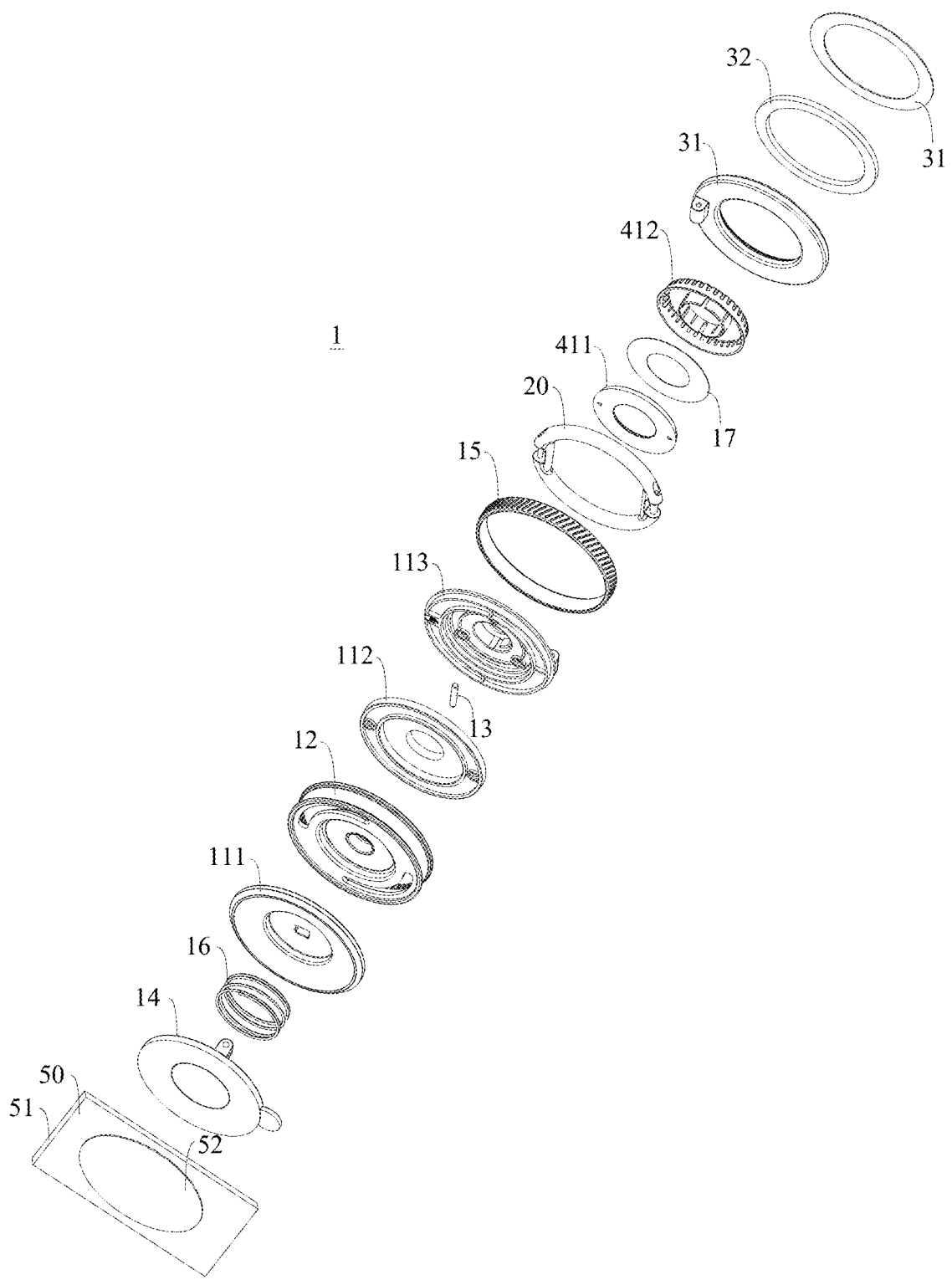
FIG. 9 is a schematic structural view of FIG. 8 from another perspective.

As shown in FIG. 8 and FIG. 9, the base 10 further includes an anti-slip portion 15 disposed on the outer periphery of the outer peripheral wall 122, the anti-slip portion 15 includes a plurality of inclined ribs or grooves arranged at intervals about the central axis of the annular hole of the connecting housing 112. By designing the anti-slip portion 15 with the plurality of inclined ribs or grooves, the frictional force between the user's fingers and the outer peripheral wall 122 is increased, thereby facilitating rotation of the drive bracket 12 by the user.

As shown in FIGS. 5 to 10, a through-hole 111b and a groove 111c communicating with the through-hole 111b are provided on the bottom surface 111a of the first housing 11, a portion of the suction cup structure 14 is disposed at one side of the bottom surface 111a of the first housing 11, and a remaining portion of the suction cup structure 14 passes through the through-hole 111b and is connected to the moving member 13. Moreover, the base 10 further includes an elastic member 16, the elastic member 16 is disposed between the suction cup structure 14 and the bottom surface 111a of the groove 111c and is connected to both the suction cup structure 14 and the bottom surface 111a of the groove 111c, and the elastic member 16 is configured to drive the suction cup structure 14 to return to an initial position during elastic recovery deformation. The clastic member 16 is configured to undergo elastic deformation during the process of the drive bracket 12 rotating in a forward direction relative to the first housing 11. The elastic member 16 is also configured to recover its elastic deformation during the process of the drive bracket 12 rotating in a backward direction relative to the first housing 11. The elastic member 16 may be either a spring or a spring plate. By designing the through-hole 111b on the bottom surface 111a of the first housing 11, a portion of the suction cup structure 14 passes through the through-hole 111b to connect to the moving member 13. This configuration reasonably utilizes the internal space of the first housing 11, enabling more compact structural arrangement between the suction cup structure 14 and the first housing 11. Consequently, the volume of the base 10 is effectively reduced, thereby reducing the overall volume of the foldable support bracket 1. By designing the clastic member 16, when the drive bracket 12 rotates in a forward direction relative to the first housing 11 under an external force, the suction cup structure 14 moves towards the external carrier under the action of the moving member 13. The movement of the suction cup structure 14 causes the elastic member 16 connected to it to undergo elastic deformation until the suction cup structure 14 reaches the suction state engaged with the external carrier. Conversely, when the drive bracket 12 rotates in a backward direction relative to the first housing 11 under an external force, the suction cup structure 14 moves away from the external carrier under the action of the moving member 13. The movement of the suction cup structure 14 causes the elastic member 16 connected to it to gradually recover its elastic deformation until the suction cup structure 14 reaches the released state detached from the external carrier. By designing the groove 111c on the bottom surface 111a of the first housing 11, the groove 111c provides a receiving space for the clastic member 16. This arrangement enables a more compact structural integration between the clastic member 16 and the first housing 11. Consequently, the volume of the base 10 is effectively reduced, thereby reducing the overall volume of the foldable support bracket 1.

Notably, when the foldable support bracket 1 is secured to an external carrier via the suction cup structure 14, the elastic member 16, on the one hand, provides structural support to the first sub-housing 111, and on the other hand, functions as a vibration-damping element. Particularly in vehicular applications where the foldable support bracket 1 is mounted on a front cockpit platform, the damping characteristics of the elastic member 16 effectively minimize the shaking of the product 2 to be secured positioned on the retention assembly.

The foldable support bracket 1 further includes a bonding member 50, and the base 10 is connected to an external carrier via the bonding member 50. Moreover, the bonding member 50 includes a substrate layer 51 and an adhesive layer 52 disposed on one side of the substrate layer 51 opposite to the bottom surface 111a. The material of the substrate layer 51 may include, but is not limited to, plastic or glass; the substrate layer 51 may have a rectangular shape. Additionally, the adhesive layer 52 is selected from double-sided tape or soft leather adhesive tape, and may have a circular shape. By designing the bonding member 50, when encountering an external carrier that is difficult to be adsorbed by the suction cup structure 14 (e.g., instances where the suction cup structure 14 would become loose), the foldable support bracket 1 can be securely fixed on the external carrier via the bonding member 50. It should be noted that when it is necessary to use the bonding member 50 to fix the foldable support bracket 1 on the external carrier, the suction cup structure 14 is first adsorbed to the substrate layer 51 of the bonding member 50, and the adhesive layer 52 is then bonded to the surface of the external carrier.

Figure 5:
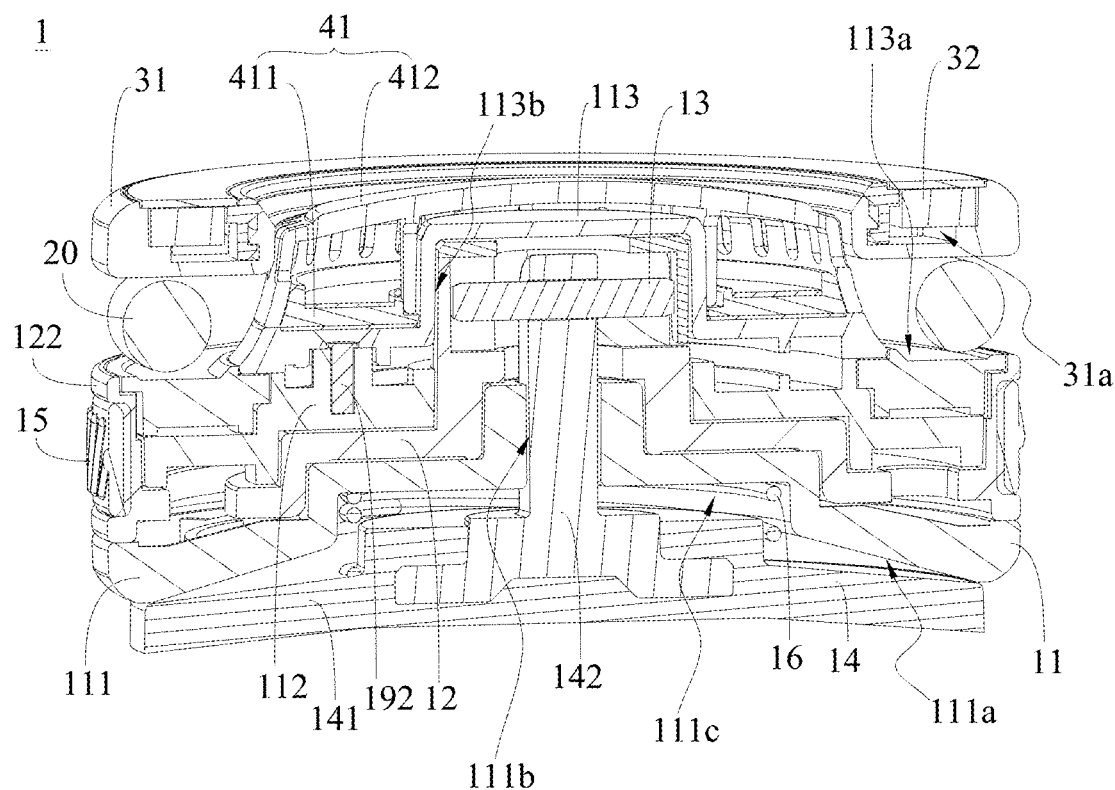
FIG. 5 is a cross-sectional schematic view of a suction cup structure of the foldable support bracket in a released state according to an embodiment of the present invention.
Figure 6:
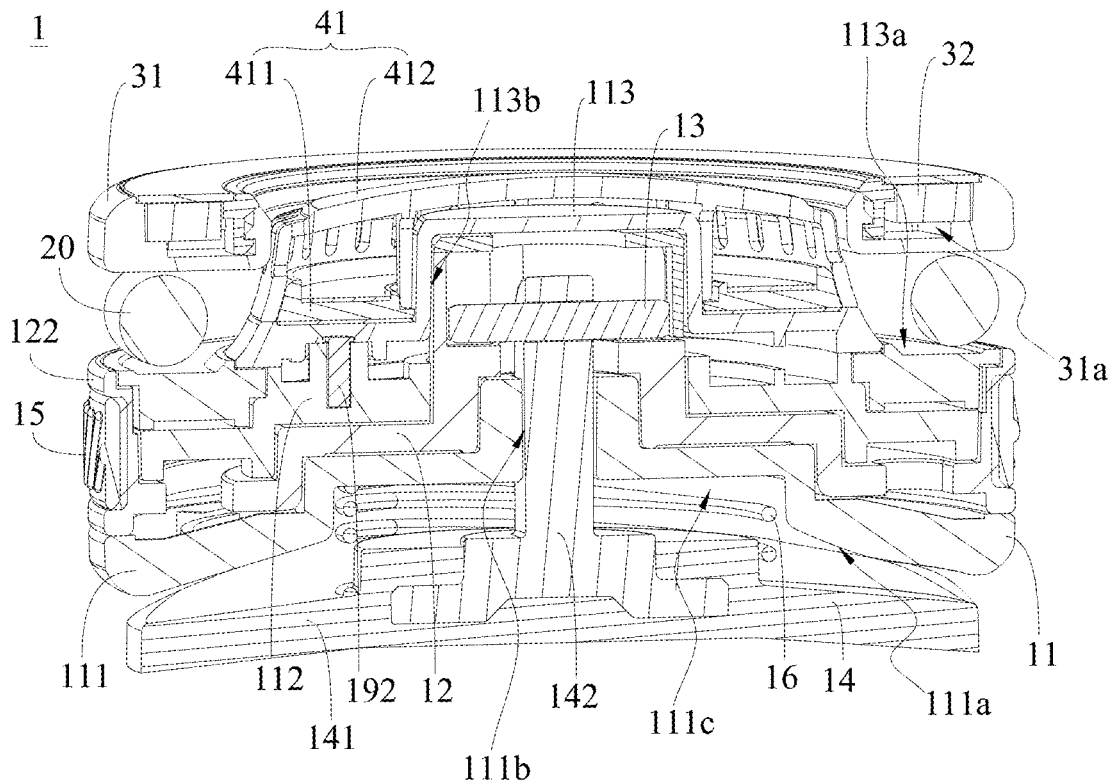
FIG. 6 is a cross-sectional schematic view of the suction cup structure of the foldable support bracket in a suction state according to an embodiment of the present invention.
Figure 13:
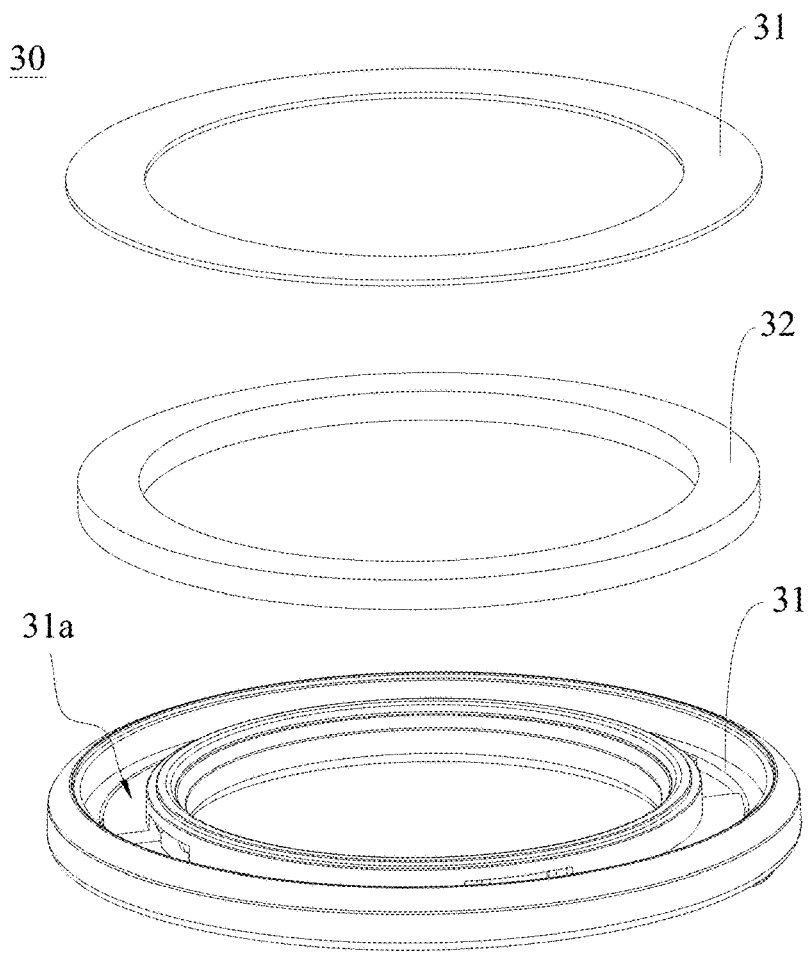
FIG. 13 is an exploded schematic view of a retention assembly according to another embodiment of the present invention.

As shown in FIG. 5, FIG. 6 and FIG. 13, the retention assembly 30 positions the product 2 to be secured through magnetic attraction, and the retention assembly 30 includes a second housing 31 and a magnetic attraction member 32. The second housing 31 is annular and is pivotally coupled to the connecting ring, and has a first receiving cavity 31a. The magnetic attraction member 32 is disposed within the first receiving cavity. When the connecting ring is in the folded non-deployed state relative to the base 10, and the retention assembly 30 is in the folded non-deployed state relative to the connecting ring, the cover 412 is positioned within both the annular hole of the connecting ring and the annular hole of the second housing 31. This configuration allows the fragrance storage case 41 to reasonably utilize the area of the annular hole of the second housing 31, thereby further effectively reducing the spatial footprint of the foldable support bracket 1 in its idle state.

Furthermore, the specific material of the second housing 31 is not limited herein, and designers can reasonably select it based on practical requirements. For example, the material of the second housing 31 may include, but is not limited to, plastic or other polymeric materials. The magnetic attraction member 32 includes a magnet. Herein, the shape and quantity of the magnetic attraction members 32 are not limited, and designers can make reasonable designs based on practical requirements. For example, when the quantity of the magnetic attraction members 32 is one, the single magnetic attraction member 32 may be annular. Moreover, when the quantity of the magnetic attraction members 32 is multiple, the multiple magnetic attraction members 32 may be fan-shaped, and the multiple fan-shaped magnetic attraction members 32 are arranged at equal intervals around the central axis of the annular hole of the second housing 31 within a second receiving cavity 33a.

When the fragrance storage unit 40 is a virtual structure such as a designated storage space for storing the fragrance product 17, the fragrance storage unit 40 is disposed on the retention assembly 30. Moreover, the fragrance storage unit 40 includes a first receiving cavity 31a, and the second housing 31 has a fragrance vent 41a communicating with the first receiving cavity 31a.

Furthermore, the shape and quantity of the fragrance vent 41a are not limited, and designers can make reasonable designs based on practical requirements. For example, when the quantity of the fragrance vent 41a is one, the single fragrance vent 41a may be annular. Moreover, when the quantity of the fragrance vent 41a is multiple, the multiple fragrance vents 41a may be waist-shaped, and the multiple waist-shaped fragrance vents 41a are arranged at equal intervals around the central axis of the annular hole of the second housing 31 on the second housing 31.

By designing the fragrance storage unit 40 within the first receiving cavity 31a of the second housing 31, this configuration allows the internal space of the second housing 31 to be fully utilized, and thereby providing a comfortable ambiance for users.

Figure 14A:
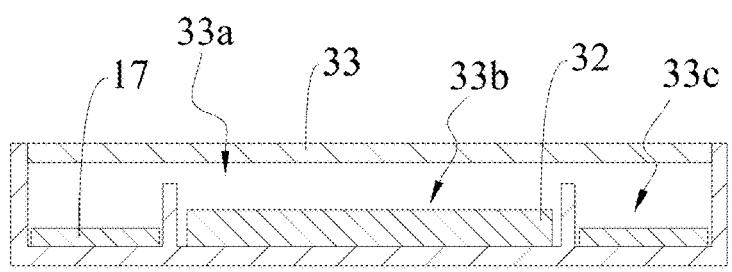
FIG. 14A is a cross-sectional schematic view of the retention assembly according to another embodiment of the present invention.
Figure 14B:
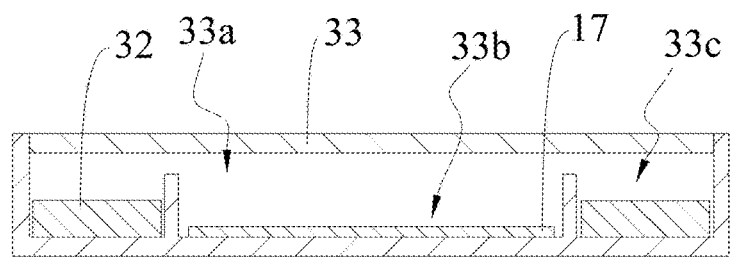
FIG. 14B is a cross-sectional schematic view of the retention assembly according to another embodiment of the present invention.

When the fragrance storage unit 40 is a virtual structure such as a designated storage space for storing the fragrance product 17, the fragrance storage unit 40 is disposed on the retention assembly 30. As shown in FIG. 14A and FIG. 14B, in other embodiments, the retention assembly 30 positions the product 2 to be secured through magnetic attraction, and the retention assembly 30 includes a third housing and a magnetic attraction member. The third housing is pivotally coupled to the linkage mechanism 20 (the connecting ring as described above) and has a second receiving cavity 33a. The second receiving cavity 33a includes a first sub-cavity 33b and a second sub-cavity 33c arranged around the first sub-cavity 33b. The magnetic attraction member is disposed within either the first sub-cavity or the second sub-cavity. The fragrance storage unit 40 includes the other one of the first sub-cavity 33b and the second sub-cavity 33c, and the third housing 33 is further provided with a fragrance vent 41a communicating with the other one of the first sub-cavity 33b and the second sub-cavity 33c.

Furthermore, the specific material of the third housing 33 is not limited herein, and designers can reasonably select it based on practical requirements. For example, the material of the third housing 33 may include, but is not limited to, plastic or other polymeric materials. Similarly, the shape and quantity of the fragrance vent 41a are not limited, and designers can make reasonable designs based on practical requirements. For example, when the quantity of the fragrance vent 41a is one, the single fragrance vent 41a may be annular. Moreover, when the quantity of the fragrance vent 41a is multiple, the multiple fragrance vents 41a may be waist-shaped, and the multiple waist-shaped fragrance vents 41a are arranged at equal intervals around the central axis of the annular hole of the connecting ring on the third housing 33. The second receiving cavity 33a in the third housing 33 is partitioned into two distinct regions: a first sub-cavity 33b and a second sub-cavity 33c, and the second sub-cavity 33c is peripherally arranged to surround the first sub-cavity 33b. Moreover, the magnetic attraction member 32 includes a magnet. Herein, the shape and quantity of the magnetic attraction members 32 are not limited, and designers can make reasonable designs based on practical requirements. For example, when the quantity of the magnetic attraction members 32 is one, the single magnetic attraction member 32 may be annular and be disposed within the second sub-cavity 33c. Meanwhile, the fragrance product 17 is disposed within the first sub-cavity 33b, and the third housing 33 is provided with a fragrance vent 41a communicating with the first sub-cavity 33b at the position corresponding to the first sub-cavity 33b. In addition, when the quantity of the magnetic attraction members 32 is multiple, the multiple magnetic attraction members 32 may be fan-shaped, and the multiple fan-shaped magnetic attraction members 32 are arranged at equal intervals around the central axis of the annular hole of the connecting ring within the second sub-cavity 33c. Meanwhile, the fragrance product 17 is disposed within the first sub-cavity 33b, and the third housing 33 is provided with a fragrance vent 41a communicating with the first sub-cavity 33b at the position corresponding to the first sub-cavity 33b. Further, when the quantity of the magnetic attraction members 32 is one, the single magnetic attraction member 32 may be circular and be disposed within the second sub-cavity 33c. Meanwhile, the fragrance product 17 is disposed within the second sub-cavity 33c, and the third housing 33 is provided with a fragrance vent 41a communicating with the second sub-cavity 33c at the position corresponding to the second sub-cavity 33c. When the quantity of the magnetic attraction members 32 is multiple, the multiple magnetic attraction members 32 may be fan-shaped, and the multiple fan-shaped magnetic attraction members 32 are arranged at equal intervals around the central axis of the annular hole of the connecting ring within the first sub-cavity 33b. Meanwhile, the fragrance product 17 is disposed within the second sub-cavity 33c, and the third housing 33 is provided with a fragrance vent 41a communicating with the second sub-cavity 33c at the position corresponding to the second sub-cavity 33c.

By designing the fragrance storage unit 40 within either the first sub-cavity 33b or the second sub-cavity 33c of the second receiving cavity 33a of the third housing 33, this configuration allows the internal space of the third housing 33 to be fully utilized, and thereby providing a comfortable ambiance for users.

When the fragrance storage unit 40 is a virtual structure such as a designated storage space for storing the fragrance product 17, the fragrance storage unit 40 also may be disposed on the linkage mechanism 20 (the connecting ring as described above), and meanwhile, the inside of the connecting ring is hollow to form a third receiving cavity (not shown in the drawings), the fragrance storage unit 40 includes the third receiving cavity, and the connecting ring is further provided with a fragrance vent 41a communicating with the third receiving cavity.

Furthermore, the shape and quantity of the fragrance vent 41a are not limited, and designers can make reasonable designs based on practical requirements. By way of example, the linkage mechanism 20 includes a connecting ring. When the quantity of the fragrance vent 41a is one, the single fragrance vent 41a may be annular. Moreover, when the quantity of the fragrance vent 41a is multiple, the multiple fragrance vents 41a may be waist-shaped, and the multiple waist-shaped fragrance vents 41a are arranged at equal intervals around the central axis of the annular hole of the connecting ring on the connecting ring.

By designing the fragrance storage unit 40 within the third receiving cavity of the connecting ring, this configuration allows the internal space of the linkage mechanism 20 to be fully utilized, and thereby providing a comfortable ambiance for users.

Figure 15:
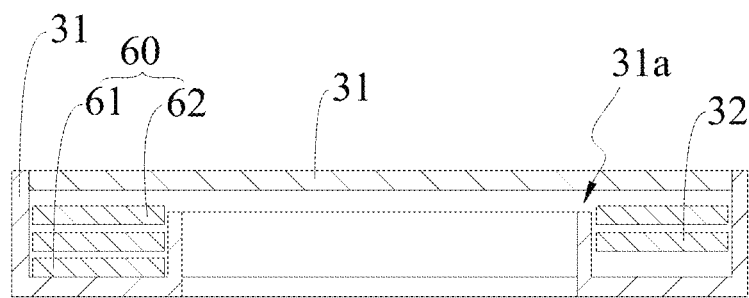
FIG. 15 is a cross-sectional schematic view showing a wireless charging module disposed within a second housing according to an embodiment of the present invention.

As shown in FIG. 15, the foldable support bracket 1 further includes a wireless charging module 60, and the wireless charging module 60 is disposed within the second receiving cavity 33a of the second housing 31. When the product 2 to be secured is positioned on the second housing 31 via the magnetic attraction member 32, the wireless charging module 60 is configured to wirelessly charge the product 2 to be secured if a current battery level of the product 2 to be secured is below a preset charge threshold. Moreover, the specific value of the preset charge threshold is not limited herein, and designers can make reasonable designs based on practical requirements. For example, the preset charge threshold may be: 100% of the full charge capacity of the power source 61; 80% of the full charge capacity of the power source 61; or 50% of the full charge capacity of the power source 61. By arranging the wireless charging module 60 within the second receiving cavity 33a of the second housing 31, the foldable support bracket 1 not only provides support for the product 2 to be secured, but also functions as a wireless charging device for charging the product 2 to be secured.

Specifically, the wireless charging module 60 includes a power source 61 and a charging coil 62. The power source 61 is disposed within the second receiving cavity 33a. And the charging coil 62 is also disposed within the second receiving cavity 33a and is electrically connected to the power source 61. When the product 2 to be secured is positioned on the second housing 31 via the magnetic attraction member 32, the power source 61 is configured to supply power to the product 2 to be secured via the charging coil 62 if the current battery level of the product 2 to be secured is below the preset charge threshold. It should be noted that wireless charging does not constitute the inventive focus of the present invention. Accordingly, detailed description of specific implementations regarding wireless charging technology is omitted herein. Conventional wireless charging techniques may be directly employed, including: current/voltage regulation configurations for device compatibility and integrated safety protections against overcharge, over-discharge, short-circuit, and overheating conditions-all of which are well-established in the existing wireless charging art.

The identical or similar numerals in the accompanying drawings in this embodiment correspond to identical or similar components. In the description of the present invention, it should be understood that orientations or positional relationships indicated by the terms "upper", "lower", "left", "right", and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so that these terms for describing the positional relationships in the accompanying drawings are only used for exemplary illustrations and are not construed as limiting the present invention. A person of ordinary skill in the art can understand the specific meanings of the above terms according to specific situations.

The above is only the preferred embodiments of the present invention, and is not intended to limit the present invention. Any modifications, equivalent replacements and improvements that are made within the spirit and principle of the present invention shall fall within the protection scope of the present invention.

What is claimed is:

1. A foldable support bracket, comprising:
   a base;
   a linkage mechanism pivotally coupled to the base and configured to switch between:
      a folded non-deployed state overlapped with the base; and
      a deployed state forming an angle with the base;
   a retention assembly configured to position a product to be secured, pivotally coupled to the linkage mechanism and configured to switch between:
      a folded non-deployed state overlapped with the linkage mechanism; and
      a deployed state forming an angle with the linkage mechanism; and
   a fragrance storage unit configured to store fragrance product;
   wherein the linkage mechanism comprises a connecting ring pivotally coupled to the base, the connecting ring defines an annular hole; when the connecting ring is in the folded non-deployed state relative to the base, at least portion of the fragrance storage unit is positioned within the annular hole of the connecting ring.

2. The foldable support bracket according to claim 1, wherein the base is provided with a bottom surface facing an external carrier, and a top surface disposed opposite to the bottom surface; the fragrance storage unit is disposed on one side of the top surface of the base.

3. The foldable support bracket according to claim 2, wherein the fragrance storage unit comprises a fragrance storage case, and the fragrance storage case comprises:
   a bottom shell disposed on the top surface; and
   a cover either movably or detachably connected to the bottom shell to together form a
      storage cavity for storing the fragrance product, and the cover is provided with at least one fragrance vent.

4. The foldable support bracket according to claim 3, wherein the at least one fragrance vent comprises a plurality of fragrance vents; the cover comprises a base plate and a sidewall structure connected to an edge of the base plate; the plurality of fragrance vents are circumferentially arranged at a junction between the base plate and the sidewall structure.

5. The foldable support bracket according to claim 3, wherein the retention assembly positions the product to be secured through magnetic attraction, and wherein the retention assembly comprises:
   a second housing in an annular shape, pivotally coupled to the connecting ring and having a first receiving cavity; and
   a magnetic attraction member disposed within the first receiving cavity;
      wherein when the connecting ring is in the folded non-deployed state relative to the base, and the retention assembly is in the folded non-deployed state relative to the connecting ring, the cover is positioned within both the annular hole of the connecting ring and the annular hole of the second housing.

6. The foldable support bracket according to claim 2, wherein the base comprises:
   a first housing having the bottom surface and the top surface;
   a drive bracket disposed on the first housing and rotatable relative to the first housing, and having an inclined surface;

a moving member disposed on the drive bracket corresponding to the inclined surface; and a suction cup structure connected to the moving member, wherein the drive bracket is configured to rotate in a forward direction relative to the first housing under an applied force, thereby pushing the moving member to move from a highest side to a lowest side of the inclined surface, such that the moving member drives the suction cup structure to move toward the external carrier to reach a suction state engaged with the external carrier; the drive bracket is further configured to rotate in a backward direction relative to the first housing under an applied force, thereby pushing the moving member to move from the lowest side to the highest side of the inclined surface, such that the moving member drives the suction cup structure to move away from the external carrier to reach a released state detached from the external carrier.

7. The foldable support bracket according to claim 6, wherein the first housing comprises a first sub-housing having the bottom surface, a second sub-housing having the top surface, and a connecting housing disposed between the first sub-housing and the second sub-housing; the first sub-housing is fixedly connected to the connecting housing, the second sub-housing is fixedly connected to the connecting housing, and the connecting housing has an annular structure;

the drive bracket comprises an inner peripheral wall, an outer peripheral wall, and a connecting wall; the inner peripheral wall is disposed within an annular hole of the connecting housing, the outer peripheral wall is arranged around a periphery of the connecting housing, the connecting wall is disposed between the first sub-housing and the connecting housing, one side of the connecting wall is connected to the inner peripheral wall, and the other side of the connecting wall is connected to the outer peripheral wall.

8. The foldable support bracket according to claim 7, wherein a region of the second sub-housing corresponding to the annular hole of the connecting housing protrudes in a direction away from the bottom surface to form a movement space;

the drive bracket further comprises a driving peripheral wall disposed within the movement space and connected to the inner peripheral wall; an inner side surface of the driving peripheral wall is formed with a first flange and a second flange protruding toward a central axis of the annular hole of the connecting housing, the first flange extends in a direction parallel to the central axis of the annular hole of the connecting housing, and the second flange extends in a direction circumferentially around the central axis of the annular hole of the connecting housing; and the second flange has the inclined surface;

further, the moving member is disposed within a space enclosed by the inner side surface of the driving peripheral wall, and one end of the moving member abuts against the first flange, and the other end of the moving member engages with the inclined surface.

9. The foldable support bracket according to claim 7, wherein one of an outer periphery of the connecting housing and an inner side surface of the outer peripheral wall is provided with a plurality of tooth grooves arranged around the central axis of the annular hole of the connecting housing; the base further comprises a tooth structure, the tooth structure is disposed on the other one of the outer periphery of the connecting housing and the inner side surface of the outer peripheral wall, and the tooth structure is engaged with a corresponding tooth groove, thereby restricting rotation of the drive bracket relative to the first housing.

10. The foldable support bracket according to claim 7, wherein the connecting wall is provided with an arcuate through-hole arranged about the central axis of the annular hole of the connecting housing; the first housing further comprises a first mounting post passing through the arcuate through-hole and fixedly connected to either the connecting housing or the first sub-housing, the first mounting post has a first mounting hole, and the other one of the connecting housing and the first sub-housing is provided with a first through hole corresponding to the first mounting hole; the base further comprises a first fastener passing through the first through hole and connected to the first mounting hole, thereby positioning the connecting housing relative to the first sub-housing; and/or the first housing further comprises a second mounting post fixedly connected to either the connecting housing or the second sub-housing, the second mounting post has a second mounting hole, and the other one of the connecting housing and the second sub-housing is provided with a second through hole corresponding to the second mounting hole; the base further comprises a second fastener passing through the second through hole and connected to the second mounting hole, thereby positioning the second sub-housing relative to the connecting housing.

11. The foldable support bracket according to claim 7, wherein the base further comprises an anti-slip portion disposed on the outer periphery of the outer peripheral wall, the anti-slip portion comprises a plurality of inclined ribs or grooves arranged at intervals about the central axis of the annular hole of the connecting housing.

12. The foldable support bracket according to claim 6, wherein a through-hole and a groove communicating with the through-hole are provided on the bottom surface of the first housing, a portion of the suction cup structure is disposed at one side of the bottom surface of the first housing, and a remaining portion of the suction cup structure passes through the through-hole and is connected to the moving member;

the base further comprises an elastic member, the elastic member is disposed between the suction cup structure and the bottom surface of the groove and is connected to both the suction cup structure and the bottom surface of the groove, and the elastic member is configured to drive the suction cup structure to return to an initial position during elastic recovery deformation.

13. The foldable support bracket according to claim 1, wherein the retention assembly positions the product to be secured through magnetic attraction and comprises:

a second housing in an annular shape, pivotally coupled to the linkage mechanism and having a first receiving cavity and a fragrance vent communicating with the first receiving cavity; the fragrance storage unit comprises the first receiving cavity; and a magnetic attraction member disposed within the first receiving cavity.

14. The foldable support bracket according to claim 1, wherein the retention assembly positions the product to be secured through magnetic attraction;

the retention assembly comprises a second housing and a magnetic attraction member, the second housing is pivotally coupled to the linkage mechanism and is provided with a second receiving cavity, and the magnetic attraction member is disposed within the second receiving cavity;

the foldable support bracket further comprises a wireless charging module disposed within the second receiving cavity; when the product to be secured is positioned on the second housing via the magnetic attraction member, the wireless charging module is configured to wirelessly charge the product to be secured if a current battery level of the product to be secured is below a preset charge threshold.

15. The foldable support bracket according to claim 14, wherein the wireless charging module comprises:
a power source disposed within the second receiving cavity; and
a charging coil disposed within the second receiving cavity and electrically connected to the power source;
when the product to be secured is positioned on the second housing via the magnetic attraction member, the power source is configured to supply power the product to be secured via the charging coil if the current battery level of the product to be secured is below the preset charge threshold.

16. A foldable support bracket, comprising:
a base;
a linkage mechanism pivotally coupled to the base and configured to switch between:
a folded non-deployed state overlapped with the base; and
a deployed state forming an angle with the base;
a retention assembly configured to position a product to be secured, pivotally coupled to the linkage mechanism and configured to switch between a folded non-deployed state overlapped with the linkage mechanism, and a deployed state forming an angle with the linkage mechanism; and
a fragrance storage unit configured to store fragrance product;
wherein the retention assembly positions the product to be secured through magnetic attraction and comprises:
a housing in an annular shape, pivotally coupled to the linkage mechanism and having a receiving cavity, and the receiving cavity comprises a first sub-cavity and a second sub-cavity arranged around the first sub-cavity; and
a magnetic attraction member disposed within either the first sub-cavity or the second sub-cavity; the fragrance storage unit comprises the other one of the first sub-cavity and the second sub-cavity, and the housing is further provided with a fragrance vent communicating with the other one of the first sub-cavity and the second sub-cavity.

17. A foldable support bracket, comprising:
a base;
a linkage mechanism pivotally coupled to the base and configured to switch between:
a folded non-deployed state overlapped with the base; and
a deployed state forming an angle with the base;
a retention assembly configured to position a product to be secured, pivotally coupled to the linkage mechanism and configured to switch between a folded non-deployed state overlapped with the linkage mechanism, and a deployed state forming an angle with the linkage mechanism; and
a fragrance storage unit configured to store fragrance product;
wherein the linkage mechanism comprises a connecting ring pivotally coupled to the base, an inside of the connecting ring is hollow to form a receiving cavity; the fragrance storage unit comprises the receiving cavity, and the connecting ring is further provided with a fragrance vent communicating with the receiving cavity.

18. A foldable support bracket, comprising:
a base;
a linkage mechanism pivotally coupled to the base and configured to switch between a folded non-deployed state overlapped with the base, and a deployed state forming an angle with the base;
a retention assembly configured to position a product to be secured, pivotally coupled to the linkage mechanism and configured to switch between a folded non-deployed state overlapped with the linkage mechanism, and a deployed state forming an angle with the linkage mechanism; and
a fragrance storage unit configured to store fragrance product, and disposed on the base, the fragrance storage unit comprises a fragrance storage case arranged on a middle portion of the base at a side of the base adjacent to the linkage mechanism;
wherein the foldable support bracket further comprises a cover covering one side of a storage cavity of the fragrance storage unit, and the cover is movably or detachably connected to the base to facilitate replacement of the fragrance product.

19. The foldable support bracket according to claim 18, wherein the linkage mechanism comprises a connecting ring having an annular hole, when the connecting ring is in the folded non-deployed state relative to the base, the cover is disposed in the annular hole of the connecting ring.

20. The foldable support bracket according to claim 18, wherein the base comprises:
a first housing;
a drive bracket disposed on the first housing and rotatable relative to the first housing, and having an inclined surface;
a moving member disposed on the drive bracket corresponding to the inclined surface; and
a suction cup structure connected to the moving member, wherein the drive bracket is configured to rotate in a forward direction relative to the first housing under an applied force, thereby pushing the moving member to move from a highest side to a lowest side of the inclined surface, such that the moving member drives the suction cup structure to move toward an external carrier to reach a suction state engaged with the external carrier; the drive bracket is further configured to rotate in a backward direction relative to the first housing under an applied force, thereby pushing the moving member to move from the lowest side to the highest side of the inclined surface, such that the moving member drives the suction cup structure to move away from the external carrier to reach a released state detached from the external carrier.

* * * * *